D. M. FERGUSON.
SUPPORT FOR COUNTER SHAFTS.
APPLICATION FILED OCT. 18, 1913.

1,200,932. Patented Oct. 10, 1916.

WITNESSES
Robert N. Van D——
Agnes M. Hipkins

INVENTOR
Donald M. Ferguson
BY
Ralgemond A. Parker
ATTORNEY

UNITED STATES PATENT OFFICE.

DONALD M. FERGUSON, OF DETROIT, MICHIGAN, ASSIGNOR TO GENERAL MOTORS COMPANY, OF DETROIT, MICHIGAN.

SUPPORT FOR COUNTER-SHAFTS.

1,200,932.   Specification of Letters Patent.   Patented Oct. 10, 1916.

Application filed October 18, 1913. Serial No. 795,852.

*To all whom it may concern:*

Be it known that I, DONALD M. FERGUSON, a citizen of the United States, residing at Detroit, county of Wayne, State of Michigan, have invented a certain new and useful Improvement in Supports for Counter-Shafts, and declare the following to be a full, clear, and exact description of the same, such as will enable others skilled in the art to which it pertains to make and use the same, reference being had to the accompanying drawings, which form a part of this specification.

My invention relates to supports for the countershaft in automobiles and consists in the improvements hereinafter described and pointed out in the claims.

Figure 1:
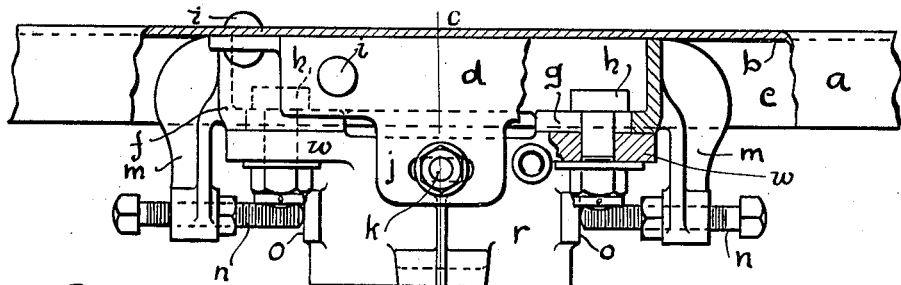
Figure 2:
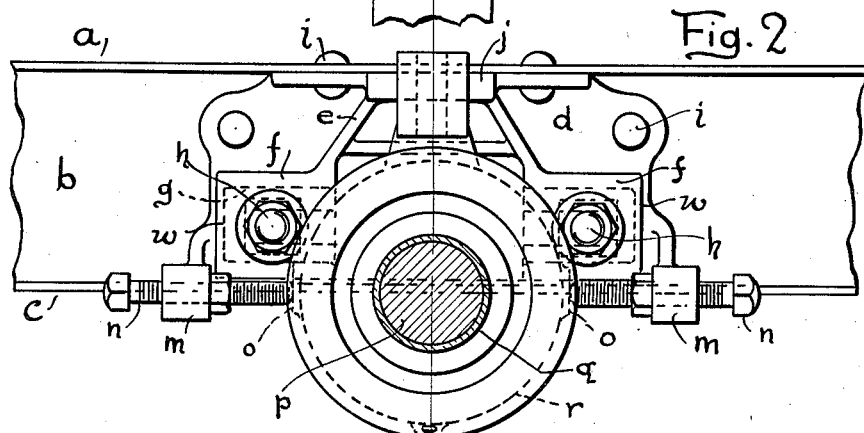
Figure 3:
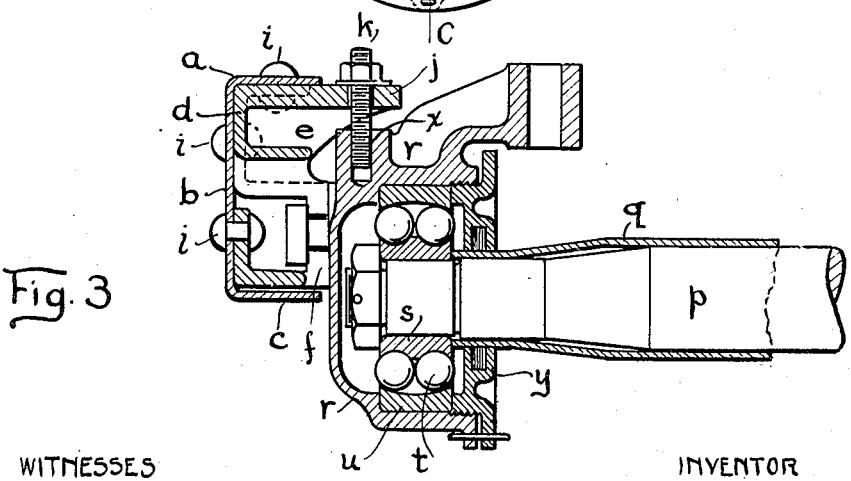

In the accompanying drawings: Figure 1, is a plan view of a portion of the side bars of an automobile chassis, the upper flange being partly broken away. Fig. 2, is an elevation of the same, the countershaft being shown in section and the point of view being from the right of Fig. 3. Fig. 3, is a section on the line C—C Figs. 1 and 2.

The construction is the same on both sides of the chassis and therefore will be described referring to but one side.

*a* is the upper horizontal, *b* is the vertical, and *c* is the lower horizontal, flange of the channel-bar side-piece of an automobile chassis or frame. The concavity, of course, opens inward.

*d* is a holding-piece, or casting, adapted to fit between the flanges *a c* and against the flange *b*, being secured in place by rivets *i*. The casting *d* consists of plates fitting against the flanges *a b* and *c* and a web *e* extending from these plates and supporting faced-off flanges *f f* having slots *g, g* therein.

*j* is a lug extending horizontally inward from the upper plate of the casting *d* just above the center of said casting.

*m m* are lugs extending from the ends of the casting *d* horizontally inward. The lug *j* has a vertical hole formed through it, and the lugs *m m* have horizontal holes formed through them with their common axis extending parallel to the side pieces, or bar, of the chassis.

*r r* is a housing for the bearing for the counter shaft. The housing *r* is provided with a screw threaded vertically extending aperture *x* (Fig. 3) at its upper and central part and there is a screw threaded bolt *k* extending through the aperture in the lug *j*, its threads engaging the threads of the aperture *x*.

*o o* are bearing surfaces in the sides of the housing *r*.

*n n* are screw threaded bolts, their threads engaging threads in the apertures through the lugs *m m* and their inner ends bearing against the surfaces *o o*. The bolts *m m* are provided with jam nuts.

*w w* are lugs, or flanges extending laterally from the housing *r*, their inner surfaces being adapted to engage against the surface of the flanges *f f* on the casting *d*.

*h h* are clamping bolts, their shanks fitting into the slots *g*, their threads engaging in the lugs *w w* and their heads bearing against a portion of the casting *d*.

The housing *r* has a cup-like construction, its open end being inward.

*p*, is the counter shaft, and *q* is a sleeve or casing, on the counter shaft *p*.

*s* is a bearing ring on the end of the counter shaft *p*.

*u* is a bearing ring fitting into the cavity of the housing *r r*.

*t t* are balls interposed between the rings *s* and *u* to constitute, with said rings, a ball bearing for the end of the shaft *p*.

*y*, is a screw threaded, flanged annular disk surrounding the shaft *p* and casing *q*, its threads engaging threads in the open end of the housing *r*. The disk *y* bears against the ring *u* and in conjunction with the shoulder on the inner wall of the housing *r* holds said ring accurately in place. The disk *y* closes the housing *r* with a tight joint so that said housing may retain lubricating material.

The above construction forms a cheap and strong support which is easily assembled.

The housing *r* and consequently the bearing therein may be accurately adjusted by the bolts *k, h, h* and when adjusted to the proper position may be firmly secured in place by the bolts *h h*.

What I claim is:

1. In an automobile, a chassis having a side bar concave inward in cross section, a holding part fitting into the hollow of said side bar and secured therein, and a bearing casing for the jack-shaft movably secured to said holding part, and means engaging said holding part and said casing for adjusting their relative positions.

2. In an automobile, a chassis having a side bar concave inward in cross section, a holding part fitting into the hollow of said side bar and secured therein, and a bearing casing for the jack-shaft movably secured to said holding part, and means engaging said holding part and said casing for adjusting their relative positions, and means for securing said parts in their adjusted positions.

3. In an automobile, a chassis having a side bar concave inward in cross section, a holding part fitting into the hollow of said side bar and secured therein, and a bearing casing for the jack-shaft movably secured to said holding part, a set screw engaging said holding part and said casing, and a second set screw or bolt at an angle to the first and engaging said holding part and casing.

4. In an automobile, a chassis having a side bar concave inward in cross section, a holding part fitting into the hollow of said side bar and secured therein, and a bearing casing for the jack-shaft movably secured to said holding part, a set screw engaging said holding part and said casing, and a second set screw or bolt at an angle to the first and engaging said holding part and casing, and a clamping bolt for securing said casing and holding part in their relative positions.

5. In an automobile, a chassis having a side bar concave inward in cross section, a holding part fitting into the hollow of said side bar and secured therein, and a bearing casing for the jack-shaft movably secured to said holding part, said holding part having a slotted flange, lugs extending from said holding part, said screws engaging said lugs, said set screws engaging said casing, and a bolt engaging said casing and fitting in the slot in said flange.

6. In an automobile, a housing for the bearing of the counter shaft, said housing having a cup-like construction with its open end inward and means for securing said housing to the frame of the automobile, means for closing the inner end of said housing with a tight joint whereby said housing is adapted to retain a lubricant, said housing being secured to the side piece of the frame.

In testimony whereof, I sign this specification in the presence of two witnesses.

DONALD M. FERGUSON.

Witnesses:
  VIRGINIA C. SPRATT,
  ELLIOTT J. STODDARD